(12) United States Patent
Fodor et al.

(10) Patent No.: US 11,171,697 B2
(45) Date of Patent: Nov. 9, 2021

(54) SPATIAL FILTERING TECHNIQUE

(71) Applicant: Telefonaktiebolaget LM Ericsson (publ), Stockholm (SE)

(72) Inventors: Gabor Fodor, Hässelby (SE); Khaled Ardah, Fortaleza (BR); Walter C. Freitas, Jr., Fortaleza (BR); Yuri C. B. Silva, Fortaleza (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/605,029

(22) PCT Filed: Apr. 24, 2018

(86) PCT No.: PCT/EP2018/060463
§ 371 (c)(1),
(2) Date: Oct. 14, 2019

(87) PCT Pub. No.: WO2018/197483
PCT Pub. Date: Nov. 1, 2018

(65) Prior Publication Data
US 2020/0350962 A1 Nov. 5, 2020

Related U.S. Application Data

(60) Provisional application No. 62/491,565, filed on Apr. 28, 2017.

(51) Int. Cl.
*H04B 7/0456* (2017.01)
*H04L 25/03* (2006.01)

(52) U.S. Cl.
CPC ..... *H04B 7/0456* (2013.01); *H04L 25/03955* (2013.01)

(58) Field of Classification Search
CPC ............. G06F 11/00; H04B 7/04; H04B 7/06; H04B 7/024; H04B 7/0452; H04B 7/0456;
(Continued)

(56) References Cited

U.S. PATENT DOCUMENTS

| 9,456,360 B2 * | 9/2016 | Morancho | H04W 52/04 |
| 2012/0046038 A1 * | 2/2012 | Gao | H04W 28/16 455/447 |
| 2014/0185481 A1 * | 7/2014 | Seol | H04W 52/24 370/252 |

(Continued)

OTHER PUBLICATIONS

Jayasinghe, P. et al., "Bi-Directional Signaling for Dynamic TDD with Decentralized Beamforming", 2015 IEEE International Conference on Communication Workshop, Jun. 8, 2015, pp. 185-190, IEEE.

(Continued)

*Primary Examiner* — Shawkat M Ali
(74) *Attorney, Agent, or Firm* — Christopher & Weisberg, P.A.

(57) ABSTRACT

A method of updating spatial filters in a radio network comprising at least two transmit nodes each in radio communication with at least one receive node on a Multiple-Input Multiple-Output (MIMO) radio channel, comprises transmitting, from the respective transmit node, first reference signals precoded by a first spatial filter of the respective transmit node; and receiving, from the receive nodes, second reference signals that are precoded using a second spatial filter of the respective receive node and an error matrix of the respective receive node. The second spatial filter depends on a channel estimate based on the transmitted first reference signals. The error matrix is indicative of an error of the first and second spatial filters in equalizing the MIMO radio channel. The method further comprises recomputing, (Continued)

for each of the at least one receive node in radio communication with the respective transmit node, the error matrix of the respective receive node; and updating the first spatial filter of the respective transmit node using the recomputed error matrix.

15 Claims, 9 Drawing Sheets

(58) Field of Classification Search
CPC ............ H04B 7/0617; H04J 1/16; H04L 5/00; H04L 5/14; H04L 5/1438; H04L 25/03955; H04L 25/03974; H04L 27/26; H04W 16/14; H04W 24/02; H04W 52/42; H04W 72/04; H04W 74/00
USPC ........ 370/252, 280, 329, 330, 352; 375/219, 375/232, 260, 267, 295, 316; 455/69, 455/114.3, 447, 450
See application file for complete search history.

(56) References Cited

U.S. PATENT DOCUMENTS

2015/0078186 A1    3/2015  Morancho et al.
2017/0126458 A1*   5/2017  Shattil ................ H04L 27/2615

OTHER PUBLICATIONS

Komulainen, P. et al., "Effective CSI Signaling and Decentralized Beam Coordination in TDD Multi-Cell MIMO Systems", IEEE Transactions on Signal Processing, vol. 61 No. 9, May 1, 2013, p. 2204-2218, IEEE.

Jayasinghe, P. et al., "Bi-Directional Signaling Strategies for Dynamic TDD Networks", 2015 IEEE 16th International Workshop on Signal Processing Advances in Wireless Communications, Jun. 28, 2015, pp. 540-544, IEEE.

Kaleva, J. et al., "Successive Convex Approximation for Simultaneous Linear TX/RX Design in MIMO BC", 2015 49th Asilomar Conference on Signals, Systems and Computers, Nov. 8, 2015, pp. 1227-1231, IEEE.

* cited by examiner

SPATIAL FILTERING TECHNIQUE

TECHNICAL FIELD

The present disclosure generally relates to a technique for updating spatial filters in a radio network. More specifically, methods and devices are provided for updating spatial filters in a radio network comprising at least two transmit nodes each in radio communication with at least one receive node on a Multiple-Input Multiple-Output (MIMO) radio channel.

BACKGROUND

Modern wireless communication systems use, for transmission and/or reception, an antenna with a plurality of antenna elements (briefly: "multi-antenna") for spatial filtering, which is also called transmit beamforming and receive beamforming, respectively. Spatial filtering can significantly increase data rates and reliability of a wireless communication. The multi-antenna is accessed through a number of antenna ports, which may be identical to the antenna elements or mapped to the antenna elements. The performance of the wireless communication is in particular improved if both a transmit node and a receive node are equipped with multi-antennas, which results in a multiple-input multiple-output (MIMO) radio channel. Herein, MIMO radio channel is used as an umbrella term also encompassing a multiple-input single-output (MISO) sub-channel from the perspective of at least one of the receive nodes.

In current and future wireless networks such as 3rd Generation Partnership Project (3GPP) 4G Long Term Evolution Advanced (LTE-A) and 5G New Radio (NR), Base Stations (BS or cells) and/or Mobile Stations (MSs or users) are equipped with multi-antennas, generically denoted as MIMO technology, to increase the data transmission multiplexing gain and/or diversity. MIMO technology can also eliminate or manage interference, achieve higher throughput and enhance system capacity. For instance, if Channel State Information (CSI) of multiple MSs is known at the BS, the BS may transmit to the multiple MSs simultaneously, thus, linearly increasing the system throughput with the number of antenna ports at the BS.

The spatial filtering for transmit beamforming and receive beamforming entails determining a linear filter, through which the respectively transmitted and received signal is passed respectively before and after the data transmission and reception on the MIMO radio channel. The spatial filters, which are typically linear filters, can be optimized from a system perspective. For example, in a Multi-Cell Multi-User system, a goal of transmit beamforming is to increase the signal power at the intended MS and reduce the interference to the non-intended MSs. Using MIMO technology, multiple BSs each equipped with multi-antennas can transmit the same data through the multiple (potentially all) antenna ports using different phases and amplitudes, which can be optimized to add coherently at the intended MSs and destructively at the non-intended MSs. However, such a non-local optimization requires distributing the CSI and data, which increases the signaling overhead.

In a single-user detection approach, the MS treats the interference as additional noise. The receive beamforming can be optimized to maximize the received Signal-to-Interference-plus-Noise Ratio (SINR), which has a closed-form solution. However, the transmit beamforming optimization is quite difficult and unknown in general. In some cases, the optimal transmit beamforming is known and has a closed-form solution. E.g., in the case of low Signal-to-Noise Ratio (SNR) values, the optimal transmit beamforming is given by the egoistic matched-filter approach, wherein the main objective is to maximize the signal power at the intended MSs. In the case of high SNR values, the optimal transmit beamforming is given by the altruistic Zero-Forcing (ZF) approach, which has the main objective of eliminating the interference-leakage to the non-intended MSs. Both approaches are far from optimal for moderate SNR values.

Thus, different alternative and iterative approaches have been proposed, wherein the BSs jointly optimize their transmit beamforming to find a good balance between maximizing the signal power and minimizing the interference leakage. One of the known approaches is named as Coordinated Multi-Point (CoMP) in the 4G LTE literature. CoMP is widely classified into Joint-Processing (JP) and Coordinated Beamforming (CBF) techniques. In contrast to JP, each MS in a CBF system is served by a single BS and, thus, the BSs do not need to share the users' data nor do they need to be time and phase synchronized. This allows locally performing user and packet scheduling at the BSs, which is in line with the LTE architecture. Therefore, the CBF technique has gained more attention than JP and has been extensively studied in the literature with different optimization criteria. Such criteria include maximization of the SINR (max-SINR) and minimization of the Mean Squared Error (MMSE) subject to maximum transmit power. That is, the max-SINR technique computes the spatial filters to maximize the received SINR. The MMSE technique computes the spatial filters to minimize the MSE of the receive data symbols.

The MMSE technique has received more attention and many publications have extended the MMSE technique for implementing a weighted MMSE (WMMSE) minimization. It turns out that the WMMSE minimization and a Weighted Sum Rate (WSR) maximization can be made equivalent by adaptively adjusting weights associated to the MSs. That is, the WSR maximization is achieved indirectly by solving the easier WMMSE minimization.

In sum, in Multi-Cell Multi-User MIMO systems, performance is heavily dependent on the transceivers design. On one hand, the closed-form solutions, such as the matched-filter and zero-forcing algorithms, are in general far from optimal and, thus, they may experience high performance loss. On the other hand, the iterative algorithms, such as the max-SINR, MMSE and WSR maximization algorithms, provide much better spectral efficiency at the expense of increasing the signaling overhead. Among all, the WSR maximization algorithm has better spectral efficiency and has the ability to prioritize and guarantee some fairness among users, as well, as compared to the max-SINR and MMSE algorithms.

Updating the receive beamforming is less problematic, since each MS updates its receive beamforming independently using the local estimated equivalent channels between itself and all BSs in the system. However, in the existing WSR maximization techniques, each BS requires (1) the MSE-matrices and (2) the equivalent channels between itself and all active MSs in the system (i.e., intended and non-intended MSs) to solve for the transmit beamforming matrices of its local MS (i.e., the intended MSs).

The publication "Effective CSI Signaling and Decentralized Beam Coordination in TDD Multi-Cell MIMO Systems" by P. Komulainen, A. Tölli and M. Juntti, IEEE Transactions on Signal Processing, vol. 61, pp. 2204-2218, 2013, describes decentralized algorithms and corresponding signaling concepts of effective CSI for WSR maximization.

However, a combination of over-the-air uplink pilot signaling and scalar backhaul information exchange is required.

In the publication "Bi-directional signaling for dynamic TDD with decentralized beamforming" by P. Jayasinghe, A. Tölli, J. Kaleva and M. Latva-aho, Proc. IEEE International Conference on Communication Workshop, 2015, the WSR maximization problem is solved via the corresponding weighted sum mean-squared error (MSE) minimization problem. However, this technique requires exchanging the spatial filters of the MSs and the MSE weight matrices of the MSs among coordinating nodes.

In sharing this information from the MSs to every BS or between all BSs, the existing techniques cause a large signaling overhead, especially if the system has a large number of MSs.

SUMMARY

Accordingly, there is a need for a technique that updates spatial filters for at least two coexisting radio communications on a MIMO radio channel with less signaling overhead. An alternative or additional object includes updating spatial filters in a radio network without additional control signaling or training signaling for exchanging MSE-matrices.

As to one aspect, a method of updating spatial filters in a radio network comprising at least two transmit nodes each in radio communication with at least one receive node on a Multiple-Input Multiple-Output (MIMO) radio channel is provided. The method comprises a step of transmitting, from the respective transmit node, first reference signals precoded by a first spatial filter of the respective transmit node. The method further comprises a step of receiving, from the receive nodes, second reference signals that are precoded using a second spatial filter of the respective receive node and an error matrix of the respective receive node. The second spatial filter depends on a channel estimate based on the transmitted first reference signals. The error matrix is indicative of an error of the first and second spatial filters in equalizing the MIMO radio channel. The method further comprises a step of recomputing, for each of the at least one receive node in radio communication with the respective transmit node, the error matrix of the respective receive node. The method further comprises a step of updating the first spatial filter of the respective transmit node using the recomputed error matrix.

By receiving, e.g., from intended and non-intended receive nodes, the second reference signals that are precoded using the second spatial filter and the error matrix, any transmit node can recompute the error matrix of any receive node without additional signaling, in at least some embodiments. For example, additional control signaling expressly including the error matrix can be avoided. Same or other embodiments can avoid additional training signalings, such as a combination of training signals precoded with and without dependence on the error matrix.

The expressions "precoding" and "precoded" may relate to applying at least the spatial filters for transmission and/or reception. The first spatial filter and the second spatial filter may also be referred to as transmit beamforming and receive beamforming, respectively. The spatial filters may also be referred to as virtual antenna ports. The reference signals may also be referred to as pilot signals or training signals.

The first spatial filter may define a transmit beamforming of the corresponding transmit node. The second spatial may define a receive beamforming of the corresponding receive node.

An instance of the method may be implemented at each of the at least two transmit nodes. In the radio network as a system, each transmit node may receive the second reference signals from the receive nodes and the update its first spatial filter.

The second reference signals from each of the receive nodes may be received at each of the at least two transmit nodes. The first reference signals from each of the at least two transmit nodes may be received at each of the receive nodes.

The precoding of the second reference signals may comprise an inverse square root of the error matrix of the respective receive node.

The second reference signals may be precoded by a product, $E_j^{-1/2} R_j$, comprising the second spatial filter, $R_j$, of the respective receive node and an inverse square root of the error matrix, $E_j^{-1/2}$, of the respective receive node.

The precoding of the second reference signals may comprise a square root, $\mu_j^{1/2}$, of a weighting factor $\mu_j > 0$ associated with the j-th receive node.

The method may further comprising or triggering a step of performing a channel estimate based on the received second reference signals.

The channel estimate based on the received second reference signals may be an estimate for the MIMO radio channel precoded by the precoding comprising the first spatial filter and the inverse square root of the error matrix. The MIMO radio channel precoded by said product may also be referred to as an equivalent channel.

Updating the first spatial filter may further use a result of the channel estimate.

The updated first spatial filter may depends on a quadratic form of the result of the channel estimate.

The result of the channel estimate may be indicative of $$X_{jk} = \mu_j^{1/2} E_j^{-1/2} R_j H_{jk},$$

wherein $E_j$, $R_j$ and $H_{jk}$ represent the error matrix, the second spatial filter and the MIMO radio channel, respectively, for the j-th receive node and the k-th transmit node, optionally including weights $\mu_j > 0$ associated with the j-th receive node.

The quadratic form of the result of the channel estimate may include $$(\mu_j^{1/2} E_j^{-1/2} R_j H_{jk})^H (\mu_j^{1/2} E_j^{-1/2} R_j H_{jk}), \text{ or}$$

$$\mu_j H_{jk}^H R_j^H E_j^{-1} R_j H_{jk},$$

wherein $E_j$, $R_j$ and $H_{jk}$ represent the error matrix, the second spatial filter and the MIMO radio channel, respectively, for the j-th receive node and the k-th transmit node, optionally including weights $p > 0$ associated with the j-th receive node.

The updated first spatial filter may depend on a product of an inverse square root of the error matrix and the result of the channel estimate for the receive node in radio communication with the respective transmit node.

The updated first spatial filter may depends on $$\mu_k E_k^{-1} R_k H_{kk}, \text{ or}$$

$$\mu_k^{1/2} E_k^{-1/2} (\mu_k^{1/2} E_k^{-1/2} R_k H_{kk}),$$

wherein $E_k$, $R_k$ and $H_{kk}$ represent the error matrix, the second spatial filter and the MIMO radio channel, respectively, for the receive node in radio communication with the respective transmit node, optionally including a weight $\mu_k > 0$ associated with the receive node.

The method may further comprise or trigger a step of transmitting data from the respective transmit node, wherein the data is precoded by the updated first spatial filter.

The receive node that is in radio communication with the respective transmit node may use the second spatial filter for receiving the data from the transmit node. Alternatively or in addition (e.g., temporarily and/or in a Time Division Duplex, TDD, mode), the receive node may transmit data using the second spatial filter for transmit precoding. The transmit node may receive the data from the receive node using the (e.g., updated) first spatial filter.

The method may further comprise or trigger a step of recomputing, for each of the at least one receive node in radio communication with the respective transmit node, the second spatial filter of the receive node. The second spatial filter of the receive node may be recomputed based on the recomputed error matrix for the same receive node.

Updating the first spatial filter of the respective transmit node may further use the recomputed second spatial filter.

Recomputing the error matrix may include iteratively solving a quadratic equation for the square root of the error matrix. The quadratic equation for the square root, $E_k^{1/2}$, of the error matrix, $E_k$, may be $$\mu_k E_k + M_k (\mu_k E_k)^{1/2} = \mu_k I, \text{ or}$$

$$\mu_k E_k + (\mu_k E_k)^{1/2} M = \mu_k I,$$

wherein $M_k = X_{kk}[(H_{kk}T_k)H_{kk}]^\backslash$, and $X_{kk} = \mu_k^{1/2} E_k^{-1/2} R_k H_{kk}$ is the result from the channel estimate, optionally including weights $\mu_k > 0$ associated with the k-th receive node. Herein, "[ . . . ]$^\backslash$" may be the matrix inverse or pseudo-inverse operation.

The method steps may be performed by the respective transmit node. At least one of the transmit nodes and the receive nodes may include a base station of the radio network. The base station may be a node providing radio access in the radio network. The base station may be a 3GPP base station, e.g., a 3rd generation base station or Universal Mobile Telecommunications System (UMTS) Node B (NB), a 4th generation base station or an evolved NB (eNB), or a 5th generation base station or gNB. Alternatively or in addition, the base station may be a non-3GPP base station, e.g., an access point according to IEEE 802.11 or Wi-Fi.

Each of the base station may define a cell of the radio network. The at least one receive node in radio communication with the respective transmit node may be a radio device within the cell defined by the respective transmit node as the base station of the cell. While each of the receive nodes may receive the first reference signals transmitted from a given one of the transmit nodes, not necessary all of the receive nodes are in radio communication with the given one of the transmit nodes and/or not necessary all of the receive nodes are within a cell defined by the given one of the transmit nodes.

At least one of the transmit nodes and the receive nodes may include a radio device configured for accessing the radio network. The radio device may be a node configured for radio access to the radio network. The radio device may be at least one of a portable or mobile station (MS), a wearable device, an Internet-of-Things device and a device for machine-type communication (MTC). For example, the radio device may be a 3GPP User Equipment (UE), e.g., a 3rd generation or Universal Mobile Telecommunications System (UMTS) UE, a 4th generation or Long Term Evolution (LTE) UE, or a 5th generation or New Radio (NR) UE. Alternatively or in addition, the radio device may be a non-3GPP radio device, e.g., a station (STA) according to IEEE 802.11 or Wi-Fi.

Each of the at least one MIMO radio channel per transmit node may function as at least one of a downlink, an uplink, a backhaul-link and a sidelink. For each pair of transmit node and receive node in radio communication, the MIMO radio channel may be a downlink and/or an uplink of the radio network. Alternatively or in addition, the MIMO radio channel may be a backhaul link of the radio network or a sidelink between radio devices. The MIMO radio channels between different pairs of transmit node and receive node in radio communication may be different in type and/or rank. The sidelink may be within a cell of the radio network or at least one of the radio devices may be out of coverage. For example, the transmit nodes and the receive nodes may be radio devices pairwisely in radio communication on a sidelink.

Since the radio network includes at least two MIMO radio channels, each terminated by a transmit node and a receive node (e.g., a radio device), the radio communication in the radio network as a whole may be referred to as Multi User MIMO (MU-MIMO) communication. Each of the transmit nodes may be scheduled for radio communication with its at least one receive node on the respective MIMO radio channel.

The first spatial filter of any one of the transmit nodes may depend on channel estimates for radio channels between the transmit node and each of the at least two receive nodes. The second spatial filter of any one of the receive nodes may depend on channel estimates for radio channels between the receive node and each of the at least two transmit nodes.

A range of the radio communication (e.g., the corresponding cell) of any one of the transmit nodes may overlap with a range of the radio communication (e.g., the corresponding cell) of at least one other of the transmit nodes. The ranges (e.g., the corresponding cells) of the transmit nodes may be (e.g., pairwisely) connected.

The first spatial filter and the second precoding may be alternatingly updated. The first and second reference signals are transmitted and received in a Time Division Duplex (TDD) mode. A frame structure of the radio network comprises a signaling part for TDD bidirectional signaling of the first and second reference signals followed by a data part for transmitting data using the updated first spatial filter.

The first reference signals transmitted from different transmit nodes and/or the second reference signals transmitted from different receive nodes may be at least one of orthogonal and synchronously signaled. The reference signals may be orthogonally coded. Each of the at least two transmit nodes may simultaneously transmit its first reference signals.

The method may be performed by a transmit node. The transmit node may be any device configured for radio communication or wireless communication. E.g., a station of a radio network may transmit the first reference signals and, optionally data. The data may be transmitted in a radio communication or wireless communication, e.g., to one or more receive nodes of the radio network.

As to another aspect, a method of updating spatial filters in a radio network comprising at least two transmit nodes each in radio communication with at least one receive node on a Multiple-Input Multiple-Output (MIMO) radio channel is provided. The method comprises or triggers a step of receiving, from each of the transmit nodes, first reference signals precoded by a first spatial filter of the respective transmit node. The method further comprises or triggers a step of transmitting, from the respective receive node, second reference signals that are precoded using a second spatial filter of the respective receive node and an error matrix of the respective receive node. The precoding enables the transmit node in radio communication with the respective receive node to recompute the error matrix of the respective receive node. The second spatial filter depends on a channel estimate based on the received first reference signals. The error matrix is indicative of an error of the first and second spatial filters in equalizing the MIMO radio channel. The method further comprises or triggers a step of receiving, using the second spatial filter, data from the transmit node in radio communication with the respective receive node, wherein the data is precoded by an updated first spatial filter depending on the recomputed error matrix.

The method may be performed by a receive node. The receive node may be any device configured for radio communication or wireless communication. E.g., one or more stations of a radio network may receive the first reference signals, and optionally data. The receive node may be embodied by any station defined above in the context of the one method aspect. The data may be received in a radio communication or wireless communication, e.g., from a transmitting station of the radio network.

An instance of the method may be performed by each of the two or more receive nodes in the radio network. The receive nodes may define or may be part of a radio network. E.g., each of the receive nodes may be in radio or wireless communication with a RAN or may be part of the RAN.

The method may further comprise any feature disclosed in the context of the one method aspect and/or one or more steps corresponding to any of the steps of the one method aspect.

Any of the transmit and receive nodes may be embodied as a radio device or terminal, e.g., configured for peer-to-peer communication (e.g., on a sidelink) and/or for accessing a radio access network (e.g. an uplink and/or downlink). The radio device may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

Alternatively or in addition, any of the transmit and receive nodes may be embodied as a controlling station of the radio network or a radio network node of the radio network, e.g. a radio access node. Examples for the controlling station or the radio access node include a base station (e.g., a 3G base station or Node B, 4G base station or eNodeB, or a 5G base station or gNodeB), an access point (e.g., a Wi-Fi access point) and a network controller (e.g., according to Bluetooth, ZigBee or Z-Wave).

Any method aspect may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspects disclosed herein when the computer program product is executed by one or more computing devices. The computer program product may be stored on a computer-readable recording medium.

The computer program product may also be provided for download via a data network, e.g., via the radio network and/or via the Internet and/or by the transmit node. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for updating spatial filters in a radio network comprising at least two transmit nodes each in radio communication with at least one receive node on a Multiple-Input Multiple-Output (MIMO) radio channel is provided. The device is configured to perform the steps of the one method aspect. Alternatively or in addition, the device comprises a transmitting unit configured to transmit, from the respective transmit node, first reference signals precoded by a first spatial filter of the respective transmit node. The device further comprises a receiving unit configured to receive, from the receive nodes, second reference signals that are precoded using a second spatial filter of the respective receive node and an error matrix of the respective receive node. The second spatial filter depends on a channel estimate based on the transmitted first reference signals. The error matrix is indicative of an error of the first and second spatial filters in equalizing the MIMO radio channel. The device further comprises a recomputing unit configured to recompute, for each of the at least one receive node in radio communication with the respective transmit node, the error matrix of the respective receive node. The device further comprises an updating unit configured to update the first spatial filter of the respective transmit node using the recomputed error matrix.

As to another device aspect, a device for updating spatial filters in a radio network comprising at least two transmit nodes each in radio communication with at least one receive node on a Multiple-Input Multiple-Output (MIMO) radio channel is provided. The device is configured to perform the other method aspect. Alternatively or in addition, the device may comprise a receiving unit configured to receive, from each of the transmit nodes, first reference signals precoded by a first spatial filter of the respective transmit node. The device further comprises a transmitting unit configured to transmit, from the respective receive node, second reference signals that are precoded using a second spatial filter of the respective receive node and an error matrix of the respective receive node. The precoding enables the transmit node in radio communication with the respective receive node to recompute the error matrix of the respective receive node. The second spatial filter depends on a channel estimate based on the received first reference signals. The error matrix is indicative of an error of the first and second spatial filters in equalizing the MIMO radio channel. The device further comprises a receiving unit configured to receive, using the second spatial filter, data from the transmit node in radio communication with the respective receive node, wherein the data is precoded by an updated first spatial filter depending on the recomputed error matrix.

As to a further device aspect, a device for updating spatial filters in a radio network comprising at least two transmit nodes each in radio communication with at least one receive node on a Multiple-Input Multiple-Output (MIMO) radio channel is provided. The device comprises at least one processor and a memory. Said memory comprises instructions executable by said at least one processor whereby the device is operative to transmit, from the respective transmit node, first reference signals precoded by a first spatial filter of the respective transmit node. Execution of the instructions further causes the device to be operative to receive, from the receive nodes, second reference signals that are precoded using a second spatial filter of the respective receive node and an error matrix of the respective receive node, wherein the second spatial filter depends on a channel estimate based on the transmitted first reference signals, and the error matrix is indicative of an error of the first and second spatial filters in equalizing the MIMO radio channel. Execution of the instructions further causes the device to be operative to recompute, for each of the at least one receive node in radio communication with the respective transmit node, the error matrix of the respective receive node. Execution of the instructions further causes the device to be operative to update the first spatial filter of the respective transmit node using the recomputed error matrix.

As to a still further device aspect, a device for updating spatial filters in a radio network comprising at least two transmit nodes each in radio communication with at least one receive node on a Multiple-Input Multiple-Output (MIMO) radio channel is provided. The device comprises at least one processor and a memory. Said memory comprises instructions executable by said at least one processor whereby the device is operative to receive, from each of the transmit nodes, first reference signals precoded by a first spatial filter of the respective transmit node. Execution of the instructions further causes the device to be operative to transmit, from the respective receive node, second reference signals that are precoded using a second spatial filter of the respective receive node and an error matrix of the respective receive node, wherein the precoding enables the transmit node in radio communication with the respective receive node to recompute the error matrix of the respective receive node, and wherein the second spatial filter depends on a channel estimate based on the received first reference signals, and the error matrix is indicative of an error of the first and second spatial filters in equalizing the MIMO radio channel. Execution of the instructions further causes the device to be operative to receive, using the second spatial filter, data from the transmit node in radio communication with the respective receive node, wherein the data is precoded by an updated first spatial filter depending on the recomputed error matrix.

As to a further aspect, a device for updating spatial filters in a radio network comprising at least two transmit nodes each in radio communication with at least one receive node on a Multiple-Input Multiple-Output (MIMO) radio channel is provided. The device may comprise one or more modules for performing the one method aspect. Alternatively or in addition, the device comprises a signal transmission module for transmitting, from the respective transmit node, first reference signals precoded by a first spatial filter of the respective transmit node. The device further comprises a signal reception module for receiving, from the receive nodes, second reference signals that are precoded using a second spatial filter of the respective receive node and an error matrix of the respective receive node, wherein the second spatial filter depends on a channel estimate based on the transmitted first reference signals, and the error matrix is indicative of an error of the first and second spatial filters in equalizing the MIMO radio channel. The device further comprises a recomputation module for recomputing, for each of the at least one receive node in radio communication with the respective transmit node, the error matrix of the respective receive node. The device further comprises an update module for updating the first spatial filter of the respective transmit node using the recomputed error matrix.

As to a further aspect, a device for updating spatial filters in a radio network comprising at least two transmit nodes each in radio communication with at least one receive node on a Multiple-Input Multiple-Output (MIMO) radio channel is provided. The device may comprise one or more modules for performing the other method aspect. Alternatively or in addition, the device comprises a signal reception module for receiving, from each of the transmit nodes, first reference signals precoded by a first spatial filter of the respective transmit node. The device further comprises a signal transmission module for transmitting, from the respective receive node, second reference signals that are precoded using a second spatial filter of the respective receive node and an error matrix of the respective receive node, wherein the precoding enables the transmit node in radio communication with the respective receive node to recompute the error matrix of the respective receive node, and wherein the second spatial filter depends on a channel estimate based on the received first reference signals, and the error matrix is indicative of an error of the first and second spatial filters in equalizing the MIMO radio channel. The device further comprises a data reception module for receiving, using the second spatial filter, data from the transmit node in radio communication with the respective receive node, wherein the data is precoded by an updated first spatial filter depending on the recomputed error matrix.

The devices and/or the nodes may further include any feature disclosed in the context of the method aspects. Particularly, any one of the units and modules, or a dedicated unit or module, may be configured to perform or initiate one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
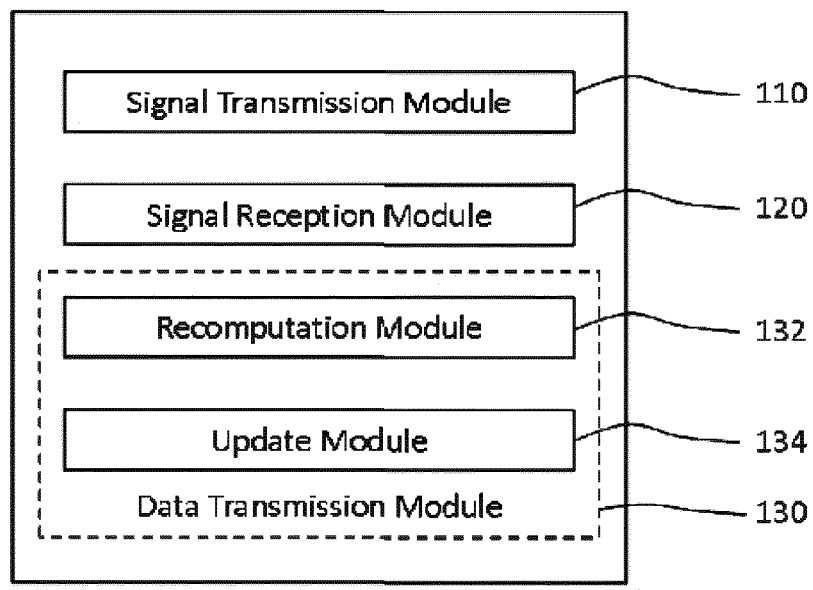
FIG. 1 shows a schematic block diagram of a device for updating spatial filters in a radio network comprising at least two radio communications on a MIMO radio channel, which device is deployable at any transmit node.

FIG. 1 schematically illustrates a block diagram for an embodiment of a device for updating spatial filters in a radio network, which device is generically referred to by reference sign 100. The radio network comprises at least two transmit nodes. Each of those transmit nodes is configured for radio communication with at least one receive node on a MIMO radio channel.

The device 100 comprises a signal transmission module 110 that transmits (e.g., by initiating the transmission of) first reference signals from the respective transmit node. The first reference signals are precoded by a first spatial filter of the respective transmit node.

The device 100 further comprises a signal reception module 120 that receives (e.g., by initiating the reception of) second reference signals from the receive nodes. These receive nodes may encompass the at least one receive node for radio communication with the respective transmit node (which is also referred to as "intended" or "associated" receive node) as well as the at least one receive node involved in a radio communication with the at least one other transmit node of the radio network (which is also referred to as "non-intended" or "non-associated" receive node).

The second reference signals are precoded using both a second spatial filter of the respective receive node and an error matrix of the respective receive node. The second spatial filter results from a channel estimate at the respective receive node based on the transmitted first reference signals. Thus, the second reference signals are received in response to transmitting the first reference signals, e.g., after a phase in which all the transmit nodes have transmitted their first reference signals.

The error matrix is specific for the respective receive node. The error matrix is indicative of an error of the first and second spatial filters in equalizing (e.g., decoupling or diagonalizing) the MIMO radio channel between the pair of nodes that are in radio communication.

The device 100 further comprises a recomputation module 132 that recomputes the error matrix of its intended one or more receive nodes. That is, it is not necessary that the error matrix be recomputed for all receive nodes. Rather, each transmit node recomputes the error matrix for each of the at least one receive node in radio communication with the respective transmit node.

The device 100 further comprises an update module 134 that updates the first spatial filter of the respective transmit node using the recomputed error matrix.

Optionally, the device 100 comprises a data transmission module 130. The recomputation module 132 and the update module 134 may be submodules of the data transmission module 130. For example, results output by the recomputation module 132 and/or the update module 134 are used for precoding data in a data transmission.

The device 100 may be connected to and/or part of the radio network. For example, an embodiment of the device 100 may be deployed at each of the at least two transmit nodes. The device 100 may be embodied by or at the respective transmit node, nodes connected to the radio network for controlling the respective transmit node or a combination thereof. The device 100 or the respective transmit node may be configured to transmit scheduling assignments to the associated receive node or to receive scheduling grants from the associated receive node.

Figure 2:
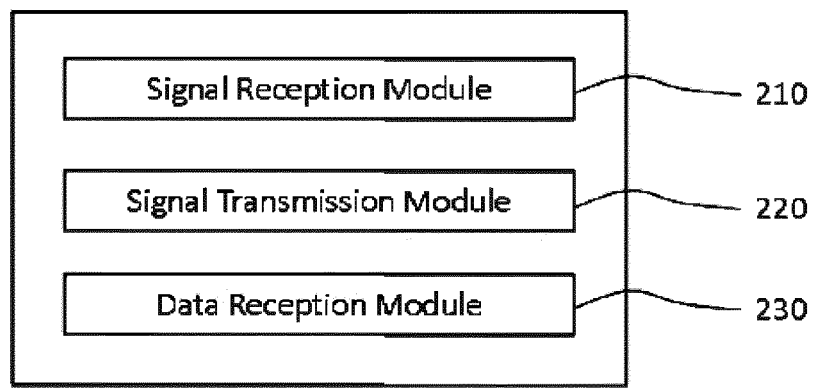
FIG. 2 shows a schematic block diagram of a device for updating spatial filters in a radio network comprising at least two radio communications on a MIMO radio channel, which device is deployable at any receive node.

FIG. 2 schematically illustrates a block diagram for an embodiment of a device for updating spatial filters in a radio network, which device is generically referred to by reference sign 200. The radio network comprises at least two transmit nodes each in radio communication with at least one receive node on a MIMO radio channel. E.g., the respective receive node is scheduled for the radio communication on the MIMO channel. The transmit node that is in radio communication with the respective receive node is also referred to as "peer" transmit node or "associated" transmit node. The respective receive node may be in radio communication with two or more transmit nodes, e.g., by implementing at the receive node an instance of the device 100 for each of the associated transmit nodes.

The device 200 comprises a signal reception module 210 that receives (e.g., by initiating the reception of) first reference signals from each of the transmit nodes. These transmit nodes may encompass the at least one associated transmit node as well as the at least one other transmit node of the radio network (also referred to as "non-associated" transmit node), with which no radio communication is intended or scheduled. The first reference signals are precoded by a first spatial filter of the respective transmit node.

The device 200 further comprises a signal transmission module 220 that transmits (e.g., by initiating the transmission of) second reference signals from the respective receive node. The second reference signals are precoded using both a second spatial filter of the respective receive node and an error matrix of the respective receive node. The precoding and the transmission of the second reference signals may be triggered in response to the reception of the first reference signals. The precoding enables the transmit node in radio communication with the respective receive node to recompute the error matrix of the respective receive node.

The second spatial filter results from a channel estimate at the respective receive node based on the received first reference signals. The channel estimator used for determining the second spatial filter may be defined by maximizing the SINR or minimizing the MSE at the respective receive node.

The error matrix is indicative of an error of the first spatial filter of the associated transmit node and its own second spatial filter in equalizing the MIMO radio channel. The respective receive node may compute the error matrix by multiplying a result of the channel estimate (which is indicative of the combined action of the first spatial filter and the MIMO radio channel) with its own second spatial filter. The error matrix may be indicative of a deviation of the result of the multiplication from an identity matrix.

Since the precoded transmission of the second reference signals enables the associated transmit node to determine the computed error matrix in an independent computation at the associated transmit node without expressly signaling the error matrix to associated transmit node, the computation at the associated transmit node is referred to as a recomputation of the error matrix.

The device 200 further comprises a data reception module 230 that receives or initiates receiving data from the at least one transmit node in radio communication with the respective receive node. The data is precoded by an updated first spatial filter, e.g., as transmit beamforming, depending on the recomputed error matrix. The data reception uses the second spatial filter, e.g., as receive beamforming.

Any of the modules of the device 100 and the device 200 may be implemented by units configured to provide the corresponding functionality.

The device 200 or the respective receive node may be configured for a radio-connected mode with the radio network. The device 200 or the respective receive node may be configured for the radio communication with the associated transmit node, e.g., configured to transmit scheduling grants to the associated transmit node or to receive scheduling assignments from associated transmit node. The device 200 may be embodied by or at the respective receive node.

The transmit node and/or the receive node may include a base station (e.g., a network controller or a Wi-Fi access point) or a radio access node (e.g. a 3G Node B, a 4G eNodeB or a 5G gNodeB) of the radio network, e.g., more specifically, of a radio access network (RAN) providing radio access to the radio network. Alternatively or in addition, the transmit node and/or the receive node may include a mobile or portable station (e.g., a Wi-Fi STA) or a radio device connectable to the radio network (e.g., more specifically, connectable to the RAN providing radio access for the radio device). The radio device may be a user equipment (UE) or a device for machine-type communication (MTC). Alternatively or in addition, each of the transmit nodes and the receive nodes may be configured to provide radio access and/or to wirelessly connect to each other, e.g., in an ad-hoc radio network or via 3GPP sidelinks.

Figure 3:
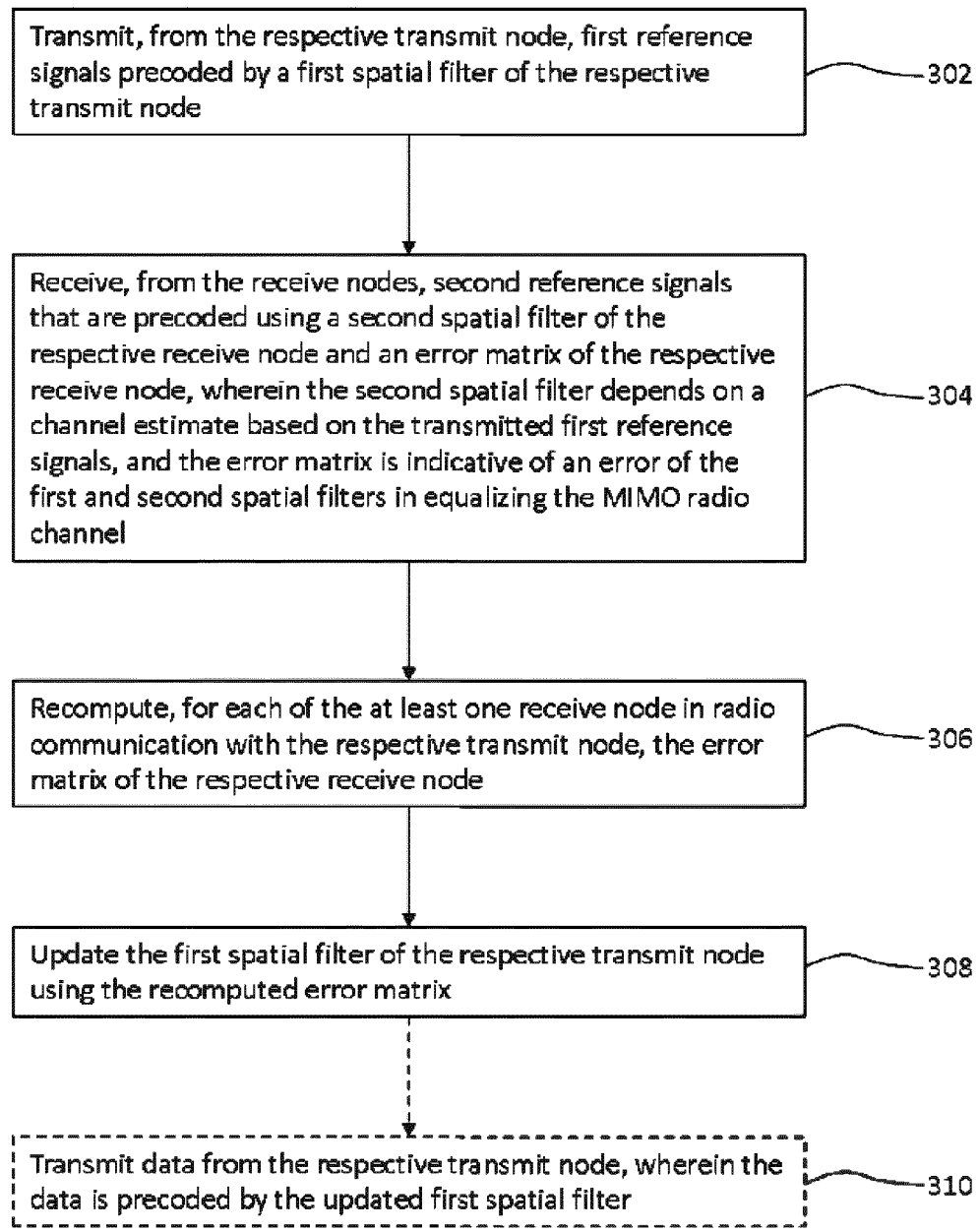
FIG. 3 shows a flowchart for a method of updating spatial filters in a radio network comprising at least two radio communications on a MIMO radio channel, which method is implementable by the device of FIG. 1.

FIG. 3 shows a flowchart for a method 300 of updating spatial filters in a radio network comprising at least two transmit nodes each in radio communication with at least one receive node on a MIMO radio channel.

The method 300 comprises a step 302 of transmitting, from the respective transmit node, first reference signals precoded by a first spatial filter of the respective transmit node. Second reference signals, precoded using a second spatial filter of the respective receive node and an error matrix of the respective receive node, are received from the receive nodes in a step 304 of the method 300. The second spatial filter depends on a channel estimate based on the first reference signals transmitted in the step 302. The error matrix is indicative of an error of the first and second spatial filters in equalizing the MIMO radio channel between the transmit and receive nodes in radio communication.

For each of the at least one receive node in radio communication with the respective transmit node, the error matrix of the respective receive node is recomputed in a step 306. In a step 308, the first spatial filter of the respective transmit node is updated using the error matrix recomputed in the step 306.

In an optional step 310, data is transmitted from the respective transmit node, wherein the data transmission is precoded by the updated first spatial filter.

The method 300 may be performed by the device 100, e.g., at or using the respective transmit node of the radio network. For example, the modules 110, 120 132 and 134 may perform the steps 302, 304, 306 and 308, respectively.

Figure 4:
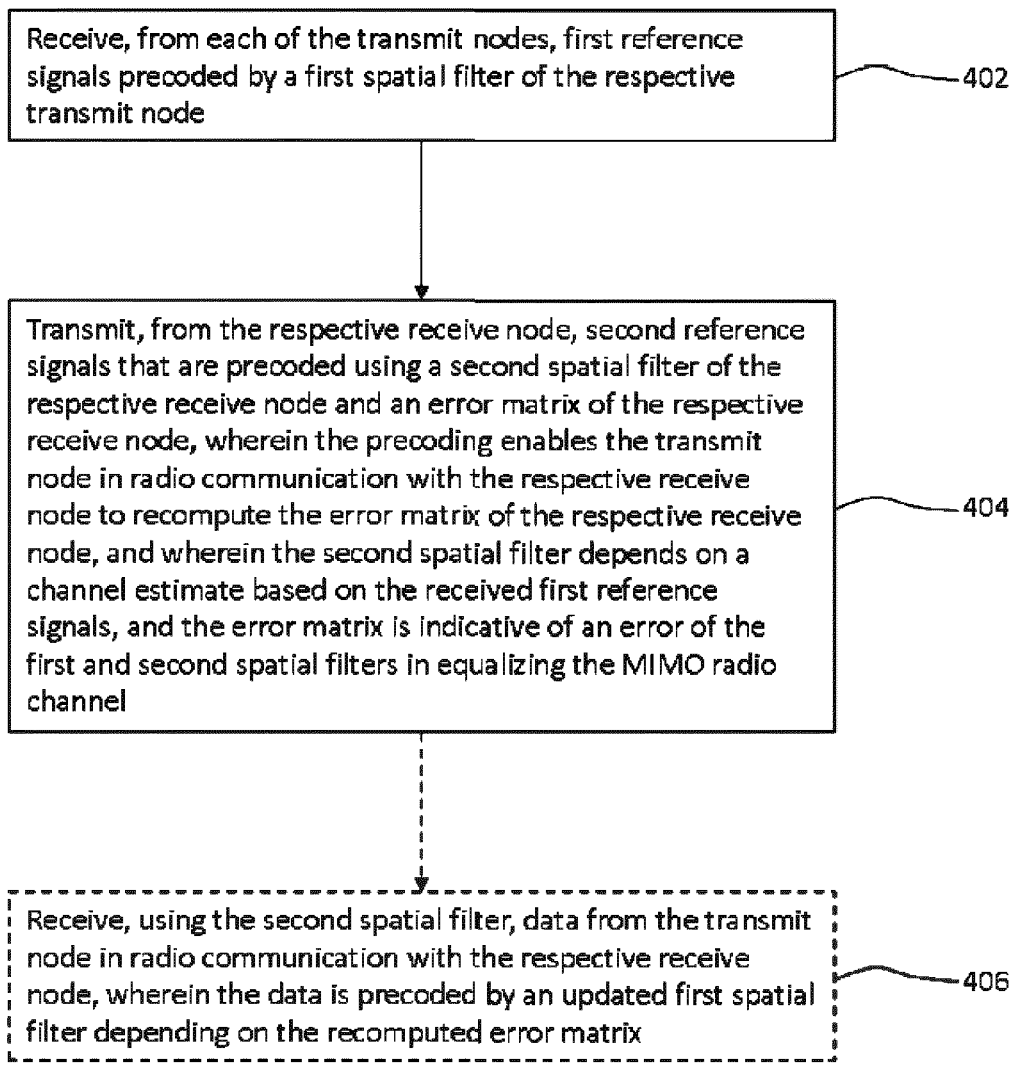
FIG. 4 shows a flowchart for a method of updating spatial filters in a radio network comprising at least two radio communications on a MIMO radio channel, which method is implementable by the device of FIG. 2.

FIG. 4 shows a flowchart for a method 400 of updating spatial filters in a radio network comprising at least two transmit nodes each in radio communication with at least one receive node on a MIMO radio channel.

The method 400 comprises a step 402 of receiving, from each of the at least two transmit nodes, first reference signals precoded by a first spatial filter of the respective transmit node. Second reference signals, precoded using a second spatial filter of the respective receive node and an error matrix of the respective receive node, are transmitted from the respective receive node in a step 404 of the method 400. The precoding enables the transmit node in radio communication with the respective receive node to recompute the error matrix of the respective receive node. The second spatial filter depends on a channel estimate based on the received first reference signals, and the error matrix is indicative of an error of the first and second spatial filters in equalizing the MIMO radio channel used for the radio communication between the associated transmit and receive nodes.

In an optional step 406 of the method 400, the second spatial filter is used for receiving data from the transmit node in radio communication with the respective receive node. More specifically, the respective receive node receives, by applying its second spatial filter to the output of the MIMO channel, the data input to the MIMO channel through an updated first spatial filter depending on the recomputed error matrix.

The method 400 may be performed by the device 200, e.g., at or using the respective receive node. For example, the modules 210 and 220, and optionally 230, may perform the steps 402 and 404, and optionally 406, respectively.

Figure 5:
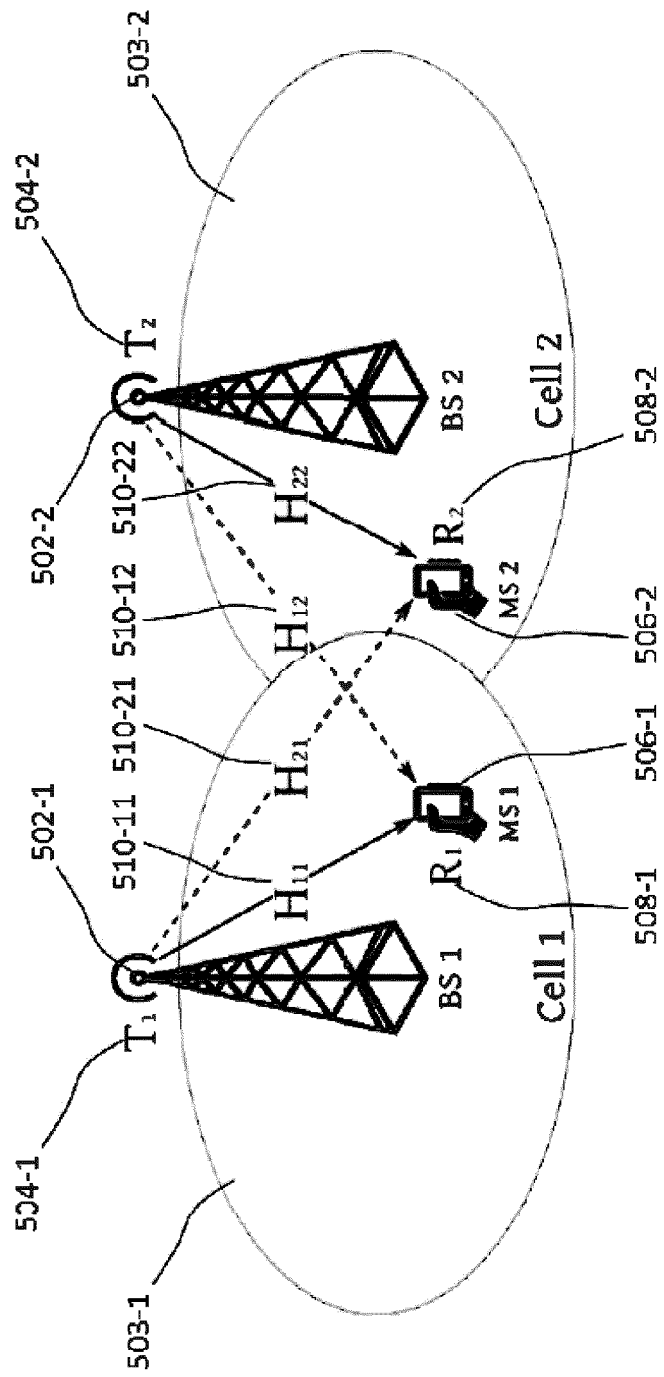
FIG. 5 schematically illustrates an exemplary radio network comprising at least two transmit nodes each in radio communication with at least one receive node on a MIMO radio channel.

FIG. 5 schematically illustrates an exemplary radio network 500 for deploying the technique according to any embodiment or implementation described herein. The radio network comprises at least two transmit nodes each in radio communication with at least one receive node on a MIMO radio channel.

For clarity and not limitation, the radio network 500 comprises two base stations (BSs) 502-1 and 502-2 functioning as the transmit nodes, respectively. The BSs 502-1 and 502-2 provide radio access to mobile stations (MSs) in cells 503-1 and 503-2, respectively. Each of the cells 503-1 and 503-2 comprises at least one MS. For clarity and not limitation, the cells 503-1 and 503-2 comprise only one MS at reference signs 506-1 and 506-2, respectively.

Each of the BSs 502-1 and 502-2 stores a first spatial filter 504-1 and 504-2, respectively, e.g., for transmit beamforming in a data transmission to the MSs 506-1 and 506-2 in the corresponding cells 503-1 and 503-2 as examples for the associated receive nodes, respectively. Each of the MSs 506-1 and 506-2 stores a second spatial filter 508-1 and 508-2, respectively, e.g., for receive beamforming in a data reception from the BSs 502-1 and 502-2, respectively.

From a system perspective, the radio network 500 comprises a Multi-Cell Multi-User MIMO Interference Channel. Due to the linearity of electrodynamics, this channel comprises independent MIMO radio channel 510-$jk$ between the BS 502-$k$ and the MS 506-$j$.

As pointed out above, for clarity of the illustration, j,k=1 or 2, in FIG. 5. More general, the radio network 500 comprises any number of transmit nodes labeled by k and each performing the method 300, and any number receive nodes labeled by j and each performing the method 400. Furthermore, the roles of BS and MS functioning as the transmit and receive nodes may be interchanged.

The MIMO channel matrix for the MIMO radio channel between the transmit node k (e.g., the BS 502-$k$) and the receive node j (e.g., the MS 506-$k$) is denoted by $H_{jk}$. The dimension of the MIMO channel matrix $H_{jk}$ is $[N_r \times N_t]$, wherein $N_r$ and $N_t$ denote, respectively, the number of antenna ports of the receive node (e.g., the number of MS antennas) and the number of antenna ports of the transmit node (e.g., the number of BS antennas). The number of receive and transmit antenna ports, $N_r$ and $N_t$, respectively, may be different for different receive and transmit nodes. The technique may be implemented for any combination of $N_r \geq 1$ and $N_t > 1$.

The first spatial filter 504-$k$ is represented by a transmit beamforming matrix, $T_k$, of the BS k and has dimension of $[N_t \times N_s]$, wherein $N_s$ denotes the number of transmitted data streams. The second spatial filter 508-$j$ is represented by a receive beamforming matrix, $R_j$, of the MS k and has dimension of $[N_s \times N_r]$. Different pairs of associated transmit and receive nodes may have different numbers, $N_s \geq 1$, of data streams. The technique may be implemented for any combination of data streams between associated transmit and receive nodes in the radio network 500.

Differences between the maximal Signal-to-Interference-plus-Noise Ratio (max-SINR) criterion and the Minimum Mean Square Error (MMSE) criterion for determining the spatial filters are summarized with reference to the exemplary radio network 500 for clarity and without being limited to this example system.

The second spatial filter, $R_j$, for the receive beamforming of the j-th receive node (e.g., the MS 506-$j$) using the max-SINR criterion may be updated, e.g., in the step 404, in accordance with $$R_j = \beta_j T_j^H H_{jj}^H (E_{k \neq j} H_{jk} T_k T_k^H H_{jk}^H + N_0 I)^{-1}, \quad (1)$$

In Eq. (1), a scaling factor $\beta_j$ is defined such that $\|R_j\|=1$, wherein $\|\cdot\|$ denotes the Euclidian norm.

Alternatively, the second spatial filter, $R_j$, for the receive beamforming of the j-th receive node (e.g., the MS 506-$j$) using the MMSE criterion may be updated, e.g., in the step 404, in accordance with $$R_j = T_j^H H_{jj}^H (\Sigma_k H_{jk} T_k T_k^H H_{jk}^H + N_0 I)^{-1}. \quad (2)$$

In Eq. (2), a variance $N_0$ corresponds to the noise power. In the above equations, $(\cdot)^{-1}$ and $(\cdot)H$ denote the matrix inverse and conjugate (Hermitian) transpose, respectively.

From the Eq. (2), one can note that the receive beamforming update $R_j$ fulfilling the MMSE criterion is not scaled to have unit norm, in contrast to the receive beamforming update $R_j$ according to Eq. (1) fulfilling the max-SINR criterion. Furthermore, the sum inside the matrix inverse is taken over all k, as opposed to k≠j for the max-SINR criterion.

Optionally, weights $\mu_j > 0$ may be associated with the j-th receive node (e.g., with the MS 506-$j$ or the corresponding user), which is referred to as weighted MMSE (WMMSE) criterion. The WMMSE criterion is a generalization of the MMSE criterion for updating the spatial filters. Here, the weights can be adjusted to prioritize the receive nodes and/or achieve a certain fairness among the receive nodes.

The updating of the second spatial filter, $R_j$, in the step 404 does not explicitly depend on the weights. That is, Eq. (2) may be used for both the MMSE criterion and the WMMSE criterion in the method 400.

Notably, the WMMSE criterion and the Weighted Sum Rate (WSR) maximization criterion can be made equivalent by adaptively adjusting the weights. Therefore, the hard WSR maximization is achieved by updating the spatial filter the easier WMMSE minimization problem.

The first spatial filter, $T_k$, of the k-th transmit node (e.g., for transmit beamforming of the BS 502-$k$) may be updated (e.g., in the step 308) for fulfilling the WSR maximization criterion in accordance with $$T_k = (\Sigma_j \mu_j H_{jk}^H R_j^H E_j^{-1} R_j H_{jk} + \vartheta_k I)^{-1} H_{kk}^H R_k^H E_k^{-1} \mu_k, \quad (3)$$

The scalar $\vartheta_k$ in Eq. (3) is defined such that $\|T_k\|_{FR}^2 \leq p_k$; wherein $p_k$ denotes a transmit power threshold, and $\|\cdot\|_{FR}^2$ denotes the Forbenius norm. For updating $R_j$ (e.g., in the step 404), the same Eq. (2) is used.

In Eq. (3), $E_k$ denotes the error matrix of the k-th receive node associated with the k-th transmit node. The error matrix $E_k$ is also referred to as the MSE matrix. The error matrix $E_k$ is computed (e.g., in the step 404) in accordance with $$E_k = I_{N_s} - R_k H_{kk} T_k. \quad (4)$$

The first spatial filter, $T_k$, fulfilling the MMSE criterion (i.e., without weights) is updated (e.g., in the step 308) according to Eq. (3) without the factors $\mu_j$ in the Eq. (3), e.g., by setting $\mu_j = 1$ for all j. For updating the second spatial filter $R_j$ (e.g., in the step 404) fulfilling the MMSE criterion, the same Eq. (2) is used.

In addition to the differences between the max-SINR and MMSE criteria pointed out above for updating the second spatial filter $R_j$ according to Eqs. (1) and (2), respectively, for updating the first spatial filter $T_k$ the matrix inverse is regularized with the scalar Ok as a Lagrange multiplier if using the MMSE criterion or the WSR maximization criterion, instead of the noise variance $N_0$ if using the max-SINR criterion. These differences in fact lead to significant sum rate achievements at high SNRs. Indeed, simulation results have shown that the MMSE criterion as well as the WSR maximization criterion lead to better sum rate performance, while an iteration according to the max-SINR criterion has faster convergence rate.

Moreover, from Eq. (3) one can notice that, in contrast to a conventional MMSE algorithm, the updated first spatial filter (e.g., for transmit beamforming) in fulfillment of the WSR maximization criterion is a function of the MSE-matrices $E_k$ of all receive nodes labeled by k (e.g., all MSs or users) in the radio network 500, as well as the associated weights $\mu_k > 0$. As a consequence, updating the spatial filters according to the WSR maximization criterion achieves much better sum rate performance than MMSE and max-SINR algorithms, and the WSR criterion provides the means to prioritize the receive nodes (e.g., the MSs or users) according to the assigned weights. For example, the prioritization allows implementing radio networks 500, in which the receive nodes (e.g., the MS or users) are associated with diverse Quality of Service (QoS) requirements.

Figure 6:
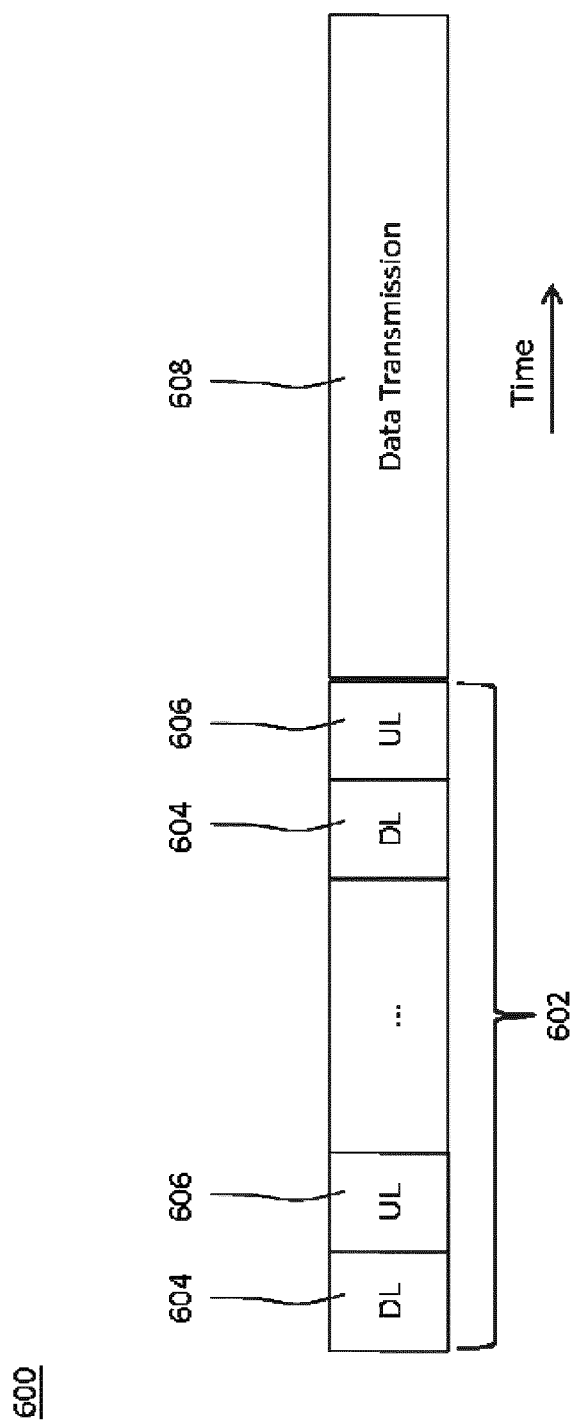
FIG. 6 schematically illustrates a radio frame structure, which is usable for implementing the methods of FIGS. 3 and 4.

FIG. 6 schematically illustrates a Time Division Duplex (TDD) frame structure 600 for alternatingly transmitting the first and second reference signals, i.e. by iteratively performing the methods 300 and 400 at the transmit nodes and the receive nodes, respectively, in a signaling phase 602. The signaling phase 602 comprises alternating downlink (DL) slots 604 and uplink (UL) slots 606. By performing the steps 302 and 402 in the DL slots 604, and the steps 304 and 404 in the UL slots 606, the transmit nodes and the receive nodes conduct some iterations to update their first and second spatial filter, respectively, before a data transmission according to the steps 310 and 406 may take place in a data transmission phase 608 of the frame structure 600.

For example, each TDD frame is divided into two phases 602 and 608 according to the frame structure 600.

Optionally, variables are signaled in the signaling phase 602. More specifically, variables are signaled between BSs and MSs in the downlink and uplink slots 604 and 606.

For clarity and without limitation, a TDD implementation of the technique is described for BSs and MSs as transmit nodes and receive nodes, respectively, which update their transmit beamforming matrices and receive beamforming matrices as first spatial filters and second spatial filters, respectively.

In updating the spatial filters (e.g., according to any one of the criteria), the transmit beamforming matrix and receive beamforming matrix are coupled together. In the step 404, $R_j$ is updated as a function of $T_k$ (more specifically, the Hermitian square of $H_{jk}T_k$). In the step 308 $T_k$ is updated as a function of $R_j$ (more specifically, the Hermitian square of $E_j^{-1/2}R_jH_{jk}$). One approach is to decouple the optimization variables by solving for one variable at a time, while keeping the others fixed. Therefore, for each MIMO channel realization, each of the methods 300 and 400 requires a number of iterations to update its spatial filter before the data transmission can take place.

Moreover, all the above algorithms are decentralized in the sense that each node (BS or MS) can calculate for its variable once it has the required information. Investigating each algorithm, we can see that with all algorithms, each MS j requires the downlink effective channels between itself and all BSs k in the radio network (e.g., to the extent as far as interference is or could be significant), i.e., $H_{jk}T_k$, $\forall k$, in order to calculate its receive beamforming $R_k$. Furthermore, each BS k, if using the max-SINR or MMSE criterion, requires the uplink effective channels between itself and all MSs j in the system, i.e., $R_jH_{jk}$, $\forall j$, to calculate the transmit beamforming $T_k$. However, if using the WSR maximization criterion, each BS k requires the weighted MSE-matrices of all MSs, i.e., $\mu_jE_j$, $\forall j$, as well. An effective implementation of the technique obtains this CSI in the TDD operation, wherein uplink training in conjunction with reciprocity simultaneously provides the BSs and the MSs with downlink as well as uplink channel estimates.

Each BS and MS has orthogonal reference signals (also: "training signals") so that each node (BS or MS) can estimate the effective channels interference-free. In LTE, such reference signals are the demodulation and sounding reference signals (DMRS and SRS).

Two conventional signaling schemes denoted A and B are discussed as comparison examples. The conventional signaling scheme A transmits first and second reference signals from BS and MS, respectively, precoded by only by the first spatial filter and second spatial filter, respectively. According to the conventional scheme A, the each BS j has to calculate $E_j$ and share $E_j$ with all other BS $k \neq j$. That is, fulfilling the WSR maximization criterion requires the BSs to perform a broadcast-and-gather operation of their MSE-matrices in order for each BS k to update the transmit beamforming matrix $T_k$.

As opposed to the conventional signaling scheme A, the technique may be implemented to avoid sharing the error matrix $E_j$ with all other transmit nodes by each transmit node.

Differently, in the conventional signaling scheme B, the MSE-matrices are embedded into the training signals, thus, eliminating the MSE-matrices feedback between BSs. However, each BS k still needs the estimate for $\mu_k E_k^{-1} R_k H_{kk}$. Therefore, according to the conventional scheme B, each MS k transmits another uplink training signal precoded with its receive beamforming $R_k$. By doing so, each BS k could estimate the equivalent channel $R_k H_{kk}$, which can be used to calculate the receive beamforming $R_k$ as well as the MSE-matrix $E_k$ of its associated MS. Using this information, each BS k can then update its transmit beamforming $T_k$.

As opposed to the conventional signaling scheme B, the technique may be implemented to avoid that each receive node has to transmit an addition set of second reference signals.

In sum, from the above comparison with conventional signaling schemes A and B, it has become apparent that a conventional WSR maximization using the conventional signaling scheme A requires the BSs to share their MSE-matrices between each other over backhaul links. Furthermore, a conventional WSR maximization using the conventional signaling scheme B requires the MSs to transmit two consecutive uplink training signals. Thus, the existing techniques for WSR maximization have a large signaling overhead. Especially if the radio network has a large number of users, the signaling overhead becomes overwhelming.

In an implementation of the method 300, each BS transmits a pilot signal as the first reference signal that is precoded with its transmit beamforming matrix as the first spatial filter according to the step 302. In implementations of the method 400 at the MS sides, each MS estimates the downlink effective channels and calculates its receive beamforming matrix, e.g., in the step 404 or a further step between the steps 402 and 404. Then, each MS transmits an uplink pilot signal as the second reference signal that is precoded with an uplink transmit beamforming filter that is formed using its receive beamforming matrix as the second spatial and a weighted MSE-matrix (i.e., the error matrix) according to the step 404.

At the BS side, each BS estimates the uplink effective channels based on the second reference signal received in the step 304. Different from existing techniques, each BS recalculates the MSE-matrix of its one or more associated MSs (e.g., users) based on the estimated uplink effective channels according to the step 306. Using the estimated and recalculated information, each BS updates its transmit beamforming matrix locally according to the step 308. This procedure is repeated iteratively until convergence or for a pre-defined maximum number of iterations.

Preferably, the set of first reference signals is orthogonal and/or the set of second reference signals is orthogonal, e.g., by means of coding. The different transmit nodes may perform the step 302 (e.g., the BSs in the DL) simultaneously. By virtue of the orthogonality, the receive nodes may estimate the effective channels interference-free in the step 402. The different receive nodes may perform the step 404 (e.g., the MSs in the UL) simultaneously. By virtue of the orthogonality, the transmit nodes may estimate the effective channels interference-free in the step 304.

Furthermore, each TDD frame may be divided into two parts for signaling and data, respectively. The signaling part is further divided into DL and UL sub-parts to facilitate the reference signaling between the transmit and receive nodes.

Figure 7:
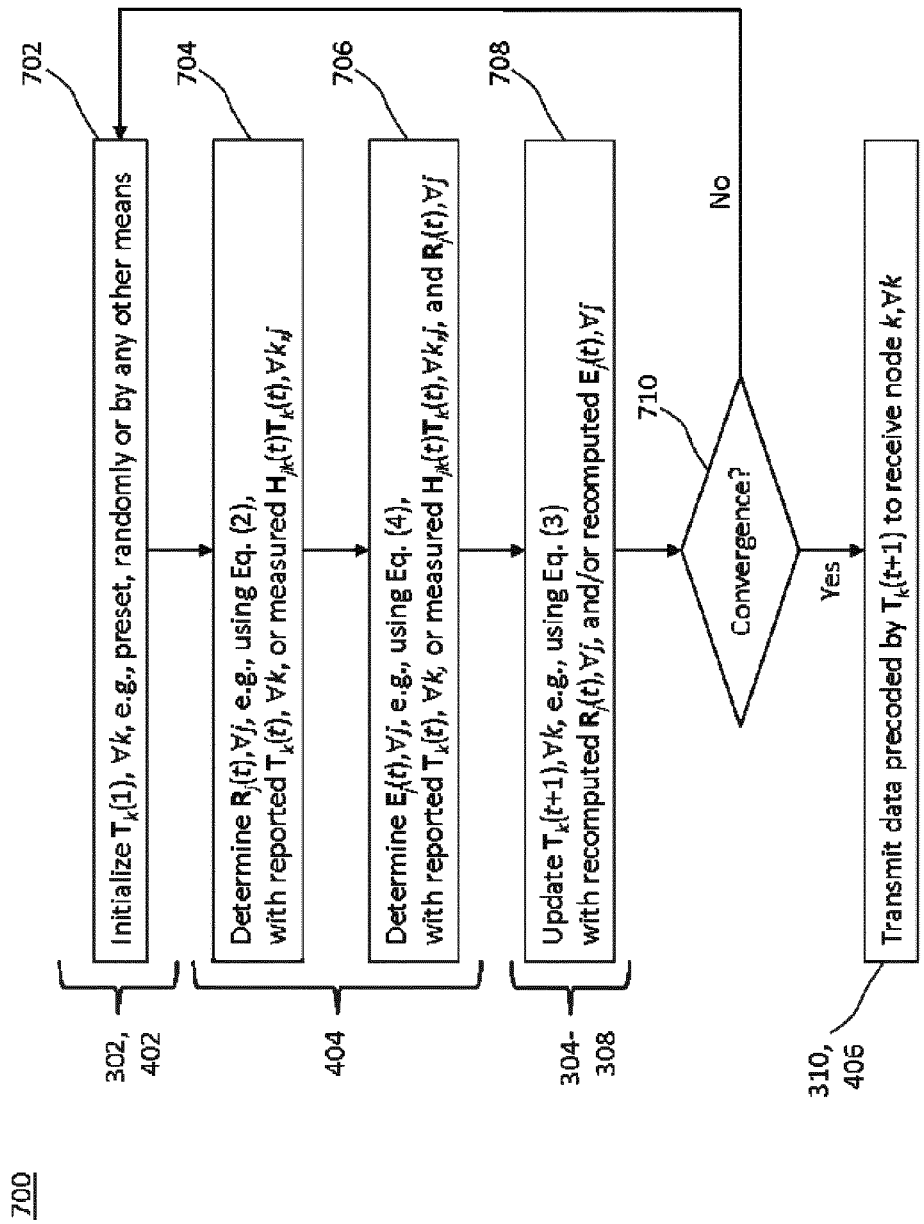
FIG. 7 shows a flowchart for an implementation of the methods of FIGS. 3 and 4.

FIG. 7 shows a flowchart 700 for an implementation of the methods 300 and 400, which is combinable with any implementation or embodiment disclosed herein. While the flowchart 700 shows aspects and steps of the methods 300 and 400 in combination to indicate an example temporal and causal order between the methods 300 and 400, any of the features and steps described for the implementation according to flowchart 700 may also be implemented in the method 300 or the method 400 as independent method aspects.

The radio network 500 may comprise K pairs of transmit node k and receive node k associated with the transmit node k (which may also be referred to as transmitter-receiver pairs). Each transmit node may define a cell and each receive node may correspond to a user, or vice versa. For simplicity and not limitation, a single user per cell is assumed. The case of multiple users per cell is readily implemented.

Each transmit node (e.g., each BS) is equipped with $N_t$ antennas (e.g., an antenna array with $N_t$ antenna ports) for transmitting $N_s$ data streams to its associated receive node (e.g., a MS) that is equipped with $N_r$ antennas (e.g., an antenna array with $N_r$ antenna ports). The rank of the first spatial filter and the second spatial filter is $N_s \leq \min\{N_r, N_t\}$.

The spatial filters, $T_k$, $R_k$, $\forall k$, are updated to fulfill the WSR maximization criterion. The WSR maximization criterion can be stated as $$\max_{T_k, R_k, \forall k} \sum_k^K \mu_k r_k(T_1, \ldots, T_K, R_1, \ldots, R_K), \quad (5)$$

$$\text{s.t.} \ \|T_k\|_{FR}^2 = p_k, \ \forall k,$$

wherein $\mu_k > 0$ are the associated weights, $p_k$ is the transmit power threshold, $T_k \in \mathbb{C}^{N_t \times N_s}$ and $R_k \in \mathbb{C}^{N_s \times N_r}$ are the transmit and receive beamforming matrices, respectively, and $r_k = \log \det(E_k^{-1})$ is the achievable rate of the k-th receive node (e.g., the k-th MS), wherein $E_k$ is the MSE-matrix and given by Eq. (4). $H_{kk} \in \mathbb{C}^{N_r \times N_t}$ is the MIMO channel matrix between BS k and MS k. In the WSR maximization criterion (5), the associated MSs weights $\mu_k$, $\forall k$, can be set by an upper application layer to reflect the priority of the MSs and/or guarantee some fairness among them.

The solutions of WSR maximization criterion (5) with respect to the second and first spatial filters, i.e., the receive and transmit beamforming, are given by Eq. (2) and Eq. (3), respectively. Then, the spatial filters are updated iteratively using the alternating optimization 700, wherein one spatial filter is updated at a time, while the other spatial filter is kept at its previous values.

FIG. 7 shows a flowchart for an implementation of the alternating optimization 700 for updating the spatial filters to fulfill the WSR maximization criterion. The iteration index is denoted by t starting with t=0. The iterations of the alternating optimization 700 have a monotonic convergence. Thus, the alternating optimization 700 conducts some iterations to update the first and second spatial filters for transmit and receive beamforming before the data transmission takes place.

A TDD system is assumed such that each TDD frame, e.g., according to the structure 600, is divided into two parts for signaling and data. The signaling part is further divided into downlink and uplink sub-parts to facilitate the exchange of variables between the BSs and MSs. Each BS and MS has orthogonal reference signals (also: pilot symbols or training symbols) in downlink and uplink direction, respectively, so that the received reference signal from each node can be distinguished.

At the step 702, which may be a substep of the step 302 in the first iteration, the first spatial filter is initialized. At each iteration, each BS k transmits a downlink pilot signal that is precoded with the transmit beamforming matrix $T_k$ according to the step 302.

At the side of the MSs, each MS k estimates the downlink effective channels $H_{kj}T_j$, $\forall j$, and calculates its receive beamforming matrix $R_k$ and MSE-matrix $E_k$ in the steps 704 and 706, which may be substeps of the step 404. Then, each MS k transmits an uplink pilot signal that is precoded with the uplink transmit beamforming that is given as $$\sqrt{\mu_k} E_k^{-\frac{1}{2}} R_k.$$

At the BSs side, each BS k estimates the uplink effective channels $$\sqrt{\mu_j} E_j^{-\frac{1}{2}} R_j H_{jk},$$

$\forall j$, in the step 304. Note that, using these estimated channels, each BS k is enabled to calculate the summation term of Eq. (3) that is inside the inverse operator. Each BS k is further required to calculate the equivalent channel $\mu_k E_k^{-1} R_k H_{kk}$ that is outside of the inverse operator in Eq. (3). To do so, each BS k recalculates the MSE-matrix of its user from the estimated uplink equivalent channel $$\sqrt{\mu_k} E_k^{-\frac{1}{2}} R_k H_{kk},$$

according to the step 306. Finally, using the estimated and recalculated information, each BS k updates its transmit beamforming matrix $T_k$ locally in the step 708 according to the step 308. This procedure is repeated iteratively until convergence is determined at the branching point 710 or for a pre-defined maximum number of iterations.

Optionally, when converged at 710 after t* iterations, the BS k further recomputes the second spatial filter of its associated receive node in accordance with $$R_k = (I_{N_s} - E_k(t^*))(H_{kk}T_k)^{-1}.$$

Figure 8:
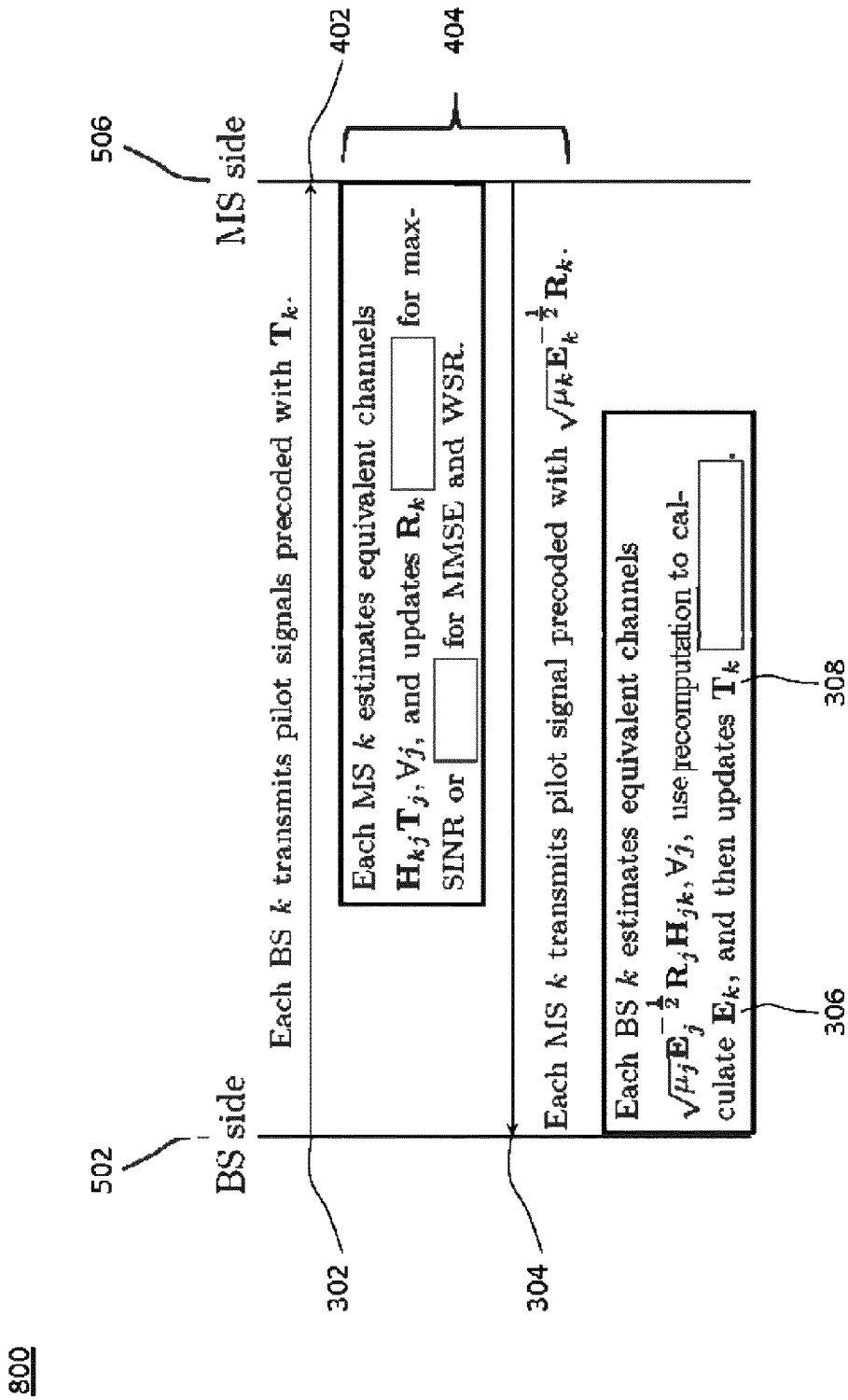
FIG. 8 shows a schematic signaling diagram resulting from embodiments of the devices of FIGS. 1 and 2 in a radio communication.

FIG. 8 shows a schematic signaling diagram resulting from performing the methods 300 and 400.

In the step 306, the recomputation enables each BS k to determine the MSE matrix of its user locally using the estimated uplink effective channel.

Figure 9:
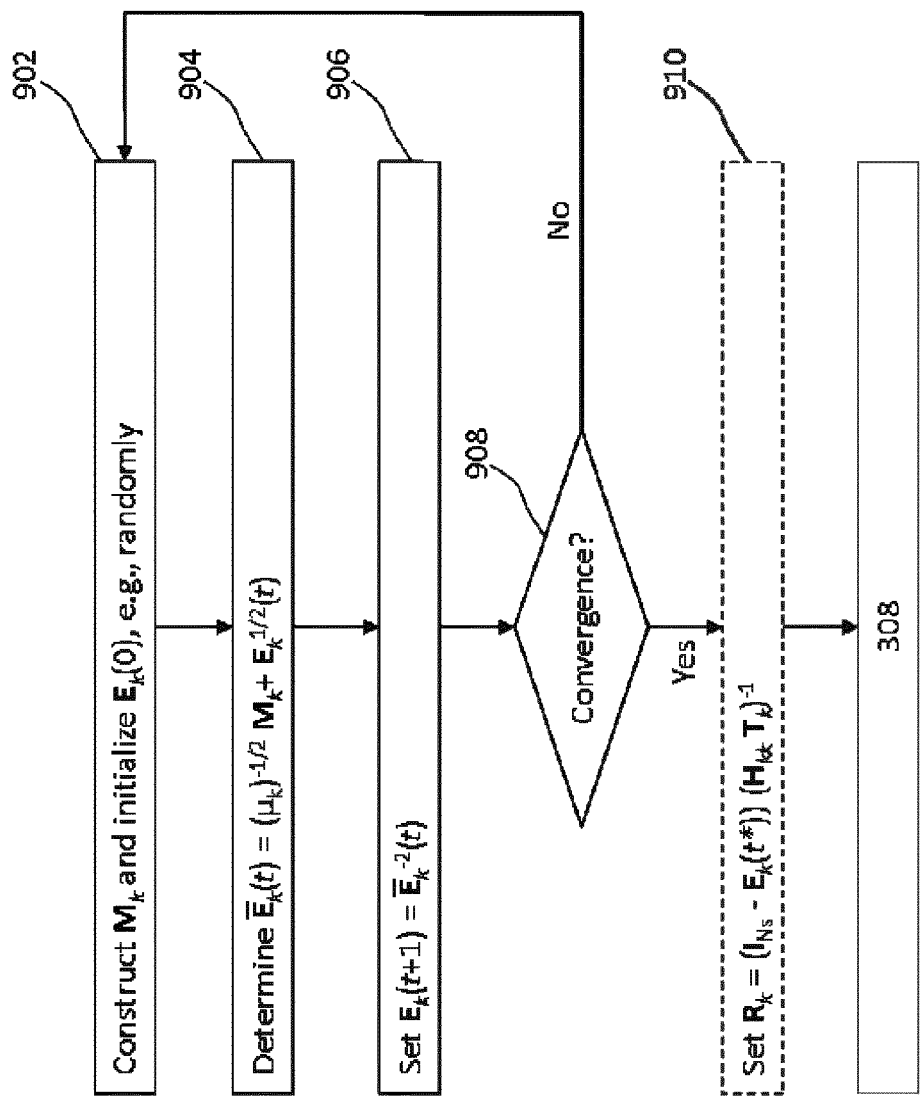
FIG. 9 shows a flowchart for an implementation of recomputing an error matrix.

FIG. 9 show a flowchart for an implementation of the recomputation 306.

Let $$X_k = \sqrt{\mu_k}\, E_k^{-\frac{1}{2}} R_k H_{kk}$$

denote the estimated uplink effective channel between BS k and its user MS k. Then, from $E_k$ given by Eq. (4), the BS may solve for $R_k$ in accordance with $$R_k = (I_{N_s} - E_k)(H_{kk} T_k)^\dagger, \quad (6)$$

wherein $(\cdot)^\dagger$ denotes the pseudo-inverse operation. Substituting $R_k$ according to Eq. (6) into $X_k$ yields $$X_k = \left(\sqrt{\mu_k}\, E_k^{-\frac{1}{2}} - \sqrt{\mu_k}\, E_k^{\frac{1}{2}}\right) Y_k,$$

wherein $Y_k = (H_{kk} T_k)^\dagger H_{kk}$. Finally, right multiply the expression $X_k$ by $Y_k^\dagger$ and simplify the resulting expression yields $$E_k^{-\frac{1}{2}} = \frac{1}{\sqrt{\mu_k}} M_k + E_k^{\frac{1}{2}}, \quad (7)$$

wherein $M_k = X_k Y_k^\dagger$. From above Eq. (7), the BS recomputes $E_k$ iteratively.

The iteration is shown in FIG. 9, wherein the matrix $M_k = X_k Y_k^\dagger$ is populated and the initial value for $E_k$ is set in a step 902. Eq. (7) defines the iteration step 904, wherein the temporary variable is $$\bar{E}_k(t+1) = E_k^{-\frac{1}{2}}(t)$$

updated in the step 906.

When convergence is determined at branching point 908, $R_k$ may optionally be recalculated, if needed, according to $$R_k = (I_{N_s} - E_k(t^*))(H_{kk} T_k)^{-1}.$$

Figure 10:
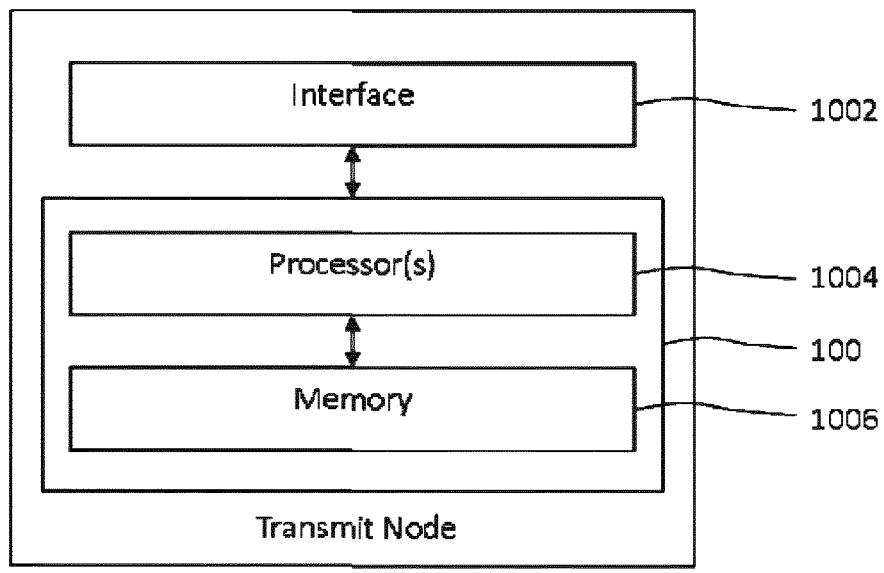
FIG. 10 shows a schematic block diagram of an embodiment of the device for updating spatial filters in a radio network, which is combinable with embodiments and implementations of FIGS. 1, 3 and 5 to 9.

FIG. 10 shows a schematic block diagram for an embodiment of the device 100, e.g., in a transmit node 1000. The device 100 comprises one or more processors 1004 for performing the method 300 and memory 1006 coupled to the processors 1004. For example, the memory 1006 may be encoded with instructions that implement at least one of the modules 110, 120 and 130. The transmit node 1000 may further comprises an antenna interface 1002 connected or connectable to antenna ports.

The one or more processors 1004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1006, the functionality of the transmit node. For example, the one or more processors 1004 may execute instructions stored in the memory 1006. Such functionality may include providing various features and steps discussed herein, including any of the benefits disclosed herein. The expression "the device being operative to perform an action" may denote the device 100 being configured to perform the action.

Figure 11:
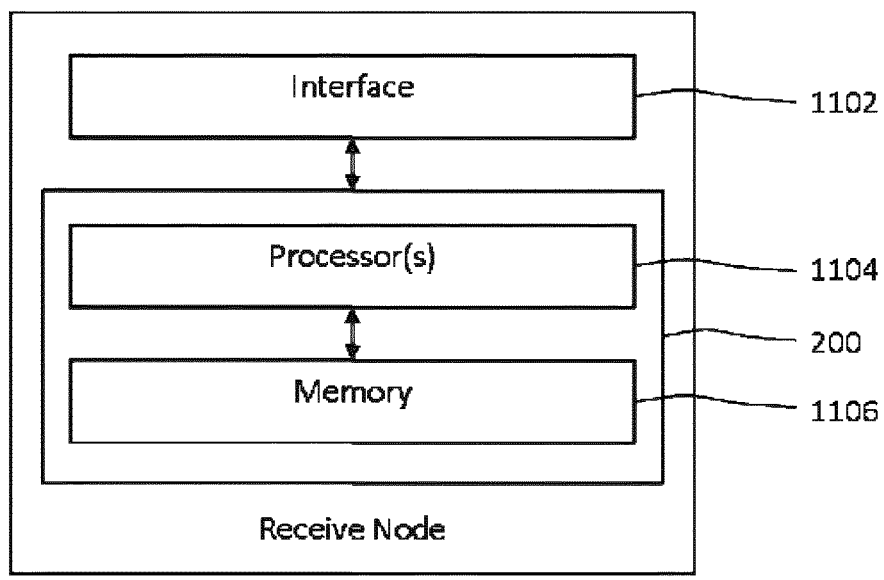
FIG. 11 shows a schematic block diagram of an embodiment of the device for updating spatial filters in a radio network, which is combinable with embodiments and implementations of FIGS. 2 and 4 to 9.

FIG. 11 shows a schematic block diagram for an embodiment of the device 200, e.g., in a receive node 1100. The device 200 comprises one or more processors 1104 for performing the method 400 and memory 1106 coupled to the processors 1104. For example, the memory 1106 may be encoded with instructions that implement at least one of the modules 210, 220 and 230. The transmit node 1100 may further comprises an antenna interface 1102 connected or connectable to antenna ports.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1106, the functionality of the receive node. For example, the one or more processors 1104 may execute instructions stored in the memory 1106. Such functionality may include providing various features and steps discussed herein, including any of the benefits disclosed herein. The expression "the device being operative to perform an action" may denote the device 200 being configured to perform the action.

As has become apparent from above description, embodiments of the technique can be implemented at BSs. The technique can enable each BS to recalculate the receive beamforming matrices and/or the MSE matrices of its users from an estimated uplink channels. By doing so, each BS may be able to update its multi-user transmit beamforming locally or any other functionality that depends on these matrices.

The technique can provide an efficient signaling mechanism in a Multi-Cell Multi-User MIMO system. The technique may be implemented iteratively, e.g., based on a TDD mode.

The technique can be implemented avoiding or eliminating backhaul data exchange between BSs, e.g., as compared to the conventional signaling scheme A. Alternatively or in combination, the technique can be implemented avoiding or eliminating extra uplink signaling from MSs, e.g., as compared to the conventional signaling scheme B. As a result, the signaling scheme of the technique can reduce the signaling overhead as compared to the existing schemes. For example, embodiments of the technique can have better scalability with the number of users than the existing signaling schemes.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of updating spatial filters in a radio network comprising at least two transmit nodes each in a radio communication with at least one receive node on a Multiple-Input Multiple-Output (MIMO) radio channel, the method comprising:
- transmitting, from a respective transmit node, first reference signals precoded by a first spatial filter of the respective transmit node, the first reference signals transmitted from different transmit nodes being at least one of orthogonal and synchronously signaled;
- receiving, from the receive nodes, second reference signals that are precoded utilizing a second spatial filter of a respective receive node and an error matrix of the respective receive node, wherein the second spatial filter depends on a channel estimate based on the transmitted first reference signals, and wherein the error matrix is indicative of an error of the first and second spatial filters in equalizing the MIMO radio channel;
- recomputing, for each of the receive nodes in the radio communication with the respective transmit node, the error matrix of the respective receive node;
- performing a channel estimate based on the received second reference signals;
- updating the first spatial filter of the respective transmit node utilizing the recomputed error matrix, the updated first spatial filter depending upon a quadratic form of a result of the channel estimate based on the received second reference signals, the quadratic form of the result comprising $\mu_j\, H_{jk}^H R_j^H E_j\text{-}1\, R_j\, H_{jk}$, the $E_j$, $R_j$, and $H_{jk}$, representing the error matrix, the second spatial filter and the MIMO radio channel, respectively, for the j-th receive node and the k-th transmit node and $\mu$ representing a weighting factor; and
- transmitting data from the respective transmit node, wherein the data is precoded by the updated first spatial filter.

2. The method of claim 1, wherein being precoded utilizing the second spatial filter of the respective receive node and the error matrix of the respective receive node of the second reference signals comprises an inverse square root of the error matrix of the respective receive node.

3. The method of claim 1, wherein the second reference signals are precoded by a product comprising the second spatial filter of the respective receive node and an inverse square root of the error matrix of the respective receive node.

4. The method of claim 1, wherein being precoded utilizing the second spatial filter of the respective receive node and the error matrix of the respective receive node of the second reference signals comprises a square root of a weighting factor greater than zero associated with the j-th receive node.

5. The method of claim 1, wherein the updated first spatial filter depends on a product of an inverse square root of the error matrix and a result of the channel estimate for the respective receive node in the radio communication with the respective transmit node.

6. The method of claim 1, further comprising recomputing, for each of the receive nodes in the radio communication with the respective transmit node, the second spatial filter of the respective receive node.

7. The method of claim 6, wherein the updating of the first spatial filter of the respective transmit node further uses the recomputed second spatial filter.

8. The method of claim 1, wherein the recomputing of the error matrix includes iteratively solving a quadratic equation for a square root of the error matrix.

9. The method of claim 1, wherein the method steps are performed by the respective transmit node.

10. The method of claim 1, wherein the first spatial filter and the precoding by the updated first spatial filter are alternatingly updated.

11. The method of claim 1, wherein the first and second reference signals are transmitted and received in a Time Division Duplex (TDD) mode.

12. The method of claim 1, wherein a frame structure of the radio network comprises a signaling part for Time Division Duplex (TDD) bidirectional signaling of the first and second reference signals followed by a data part for transmitting data utilizing the updated first spatial filter.

13. A method of updating spatial filters in a radio network comprising at least two transmit nodes each in a radio communication with at least one receive node on a Multiple-Input Multiple-Output (MIMO) radio channel, the method comprising:
- receiving, from each of the transmit nodes, first reference signals precoded by a first spatial filter of a respective transmit node, the first reference signals received from different transmit nodes being at least one of orthogonal and synchronously signaled;
- transmitting, from a respective receive node, second reference signals that are precoded utilizing a second spatial filter of the respective receive node and an error matrix of the respective receive node, wherein being precoded utilizing the second spatial filter of the respective receive node and the error matrix of the respective receive node enables the respective transmit node in the radio communication with the respective receive node to recompute the error matrix of the respective receive node, and wherein the second spatial filter depends on a channel estimate based on the received first reference signals, and wherein the error matrix is indicative of an error of the first and second spatial filters in equalizing the MIMO radio channel;
- performing a channel estimate based on the received second reference signals; and
- receiving, utilizing the second spatial filter, data from the transmit node in the radio communication with the respective receive node, wherein the data is precoded by an updated first spatial filter, the updated first spatial filter depending on the recomputed error matrix and a quadratic form of a result of the channel estimate based on the received second reference signals, the quadratic form of the result comprising $\mu_j\, H_{jk}^H R_j^H E_j\text{-}1\, H_{jk}$, the $E_j$, $R_j$, and $H_{jk}$, representing the error matrix, the second spatial filter and the MIMO radio channel, respectively, for the j-th receive node and the k-th transmit node and $\mu$ representing a weighting factor.

14. A device for updating spatial filters in a radio network comprising at least two transmit nodes each in a radio communication with at least one receive node on a Multiple-Input Multiple-Output (MIMO) radio channel, the device comprising:
- processing circuitry;
- memory containing instructions executable by the processing circuitry to cause the device to:
  - transmit, from a respective transmit node, first reference signals precoded by a first spatial filter of the respective transmit node, the first reference signals transmitted from different transmit nodes being at least one of orthogonal and synchronously signaled;
  - receive, from the receive nodes, second reference signals that are precoded utilizing a second spatial filter of a respective receive node and an error matrix of the respective receive node, wherein the second spatial filter depends on a channel estimate based on the transmitted first reference signals, and wherein the error matrix is indicative of an error of the first and second spatial filters in equalizing the MIMO radio channel;

recompute, for each of the receive nodes in the radio communication with the respective transmit node, the error matrix of the respective receive node;

perform a channel estimate based on the received second reference signals;

update the first spatial filter of the respective transmit node utilizing the recomputed error matrix and a quadratic form of a result of the channel estimate based on the received second reference signals, the quadratic form of the result comprising $\mu_j H_{jk}^H R_j^H E_j^{-1} H_{jk}$, the $E_j$, $R_j$, and $H_{jk}$, representing the error matrix, the second spatial filter and the MIMO radio channel, respectively, for the j-th receive node and the k-th transmit node and $\mu$ representing a weighting factor; and transmit data from the respective transmit node, wherein the data is precoded by the updated first spatial filter.

15. A device for updating spatial filters in a radio network comprising at least two transmit nodes each in a radio communication with at least one receive node on a Multiple-Input Multiple-Output (MIMO) radio channel, the device comprising:

processing circuitry; memory containing instructions executable by the processing circuitry to cause the device to:

receive, from each of the transmit nodes, first reference signals precoded by a first spatial filter of a respective transmit node, the first reference signals received from different transmit nodes being at least one of orthogonal and synchronously signaled;

transmit, from a respective receive node, second reference signals that are precoded utilizing a second spatial filter of the respective receive node and an error matrix of the respective receive node, wherein being precoded utilizing the second spatial filter of the respective receive node and the error matrix of the respective receive node enables the respective transmit node in the radio communication with the respective receive node to recompute the error matrix of the respective receive node, and wherein the second spatial filter depends on a channel estimate based on the received first reference signals, and wherein the error matrix is indicative of an error of the first and second spatial filters in equalizing the MIMO radio channel;

perform a channel estimate based on the received second reference signals; and receive, utilizing the second spatial filter, data from the transmit node in the radio communication with the respective receive node, wherein the data is precoded by an updated first spatial filter, the updated first spatial filter depending on the recomputed error matrix and a quadratic form of a result of the channel estimate based on the received second reference signals, the quadratic form of the result comprising $\mu_j H_{jk}^H R_j^H E_j^{-1} R_j H_{jk}$, the $E_j$, $R_j$, and $H_{jk}$, representing the error matrix, the second spatial filter and the MIMO radio channel, respectively, for the j-th receive node and the k-th transmit node and $\mu$ representing a weighting factor.

* * * * *